United States Patent
Flint et al.

(10) Patent No.: US 9,170,975 B2
(45) Date of Patent: Oct. 27, 2015

(54) HIGH SPEED OVERLAY OF IDLE I2C BUS BANDWIDTH

(71) Applicant: Lenovo Enterprise Solutions (Singapore) Pte. Ltd., Singapore (SG)

(72) Inventors: Stephen J. Flint, Ottawa (CA); Michael W. J. Hogan, Kanata (CA); Lucian T. Rusu, Ottawa (CA)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 372 days.

(21) Appl. No.: 13/733,177

(22) Filed: Jan. 3, 2013

(65) Prior Publication Data

US 2014/0189177 A1     Jul. 3, 2014

(51) Int. Cl.
   *G06F 13/42* (2006.01)

(52) U.S. Cl.
   CPC .... *G06F 13/4282* (2013.01); *G06F 2213/0016* (2013.01)

(58) Field of Classification Search
   CPC ................ G06F 13/4282; G06F 2213/0016
   See application file for complete search history.

(56) References Cited

U.S. PATENT DOCUMENTS

| | | | |
|---|---|---|---|
| 4,873,705 A | 10/1989 | Johnson | |
| 5,881,248 A * | 3/1999 | Mergard | 710/100 |
| 6,873,623 B2 | 3/2005 | Weirich et al. | |
| 7,051,229 B2 | 5/2006 | Margerm et al. | |

OTHER PUBLICATIONS

Davis, GT. "Interfacing of Slow Direct Memory Access and Peripheral Devices to a High Speed Bus". IP.com No. IPCOM000044056D. Original Publication Date: Oct. 1, 1984. Original Disclosure Information: TDB Oct. 1984 p. 3161-3163. IP.com Electronic Publication: Feb. 5, 2005. IP.com Prior Art Database at: http://www.ip.com/pubview/IPCOM000044056D.

Feiste, K et al. "Multiple Bus System with Variable Bus Speed and Bus Width". IP.com No. IPCOM000113740D Original Publication Date: Sep. 1, 1994. Original Disclosure Information: TDB v37 n9 Sep. 1994 p. 641-644. IP.com Electronic Publication: Mar. 27, 2005. IP.com Prior Art Database at: http://www.ip.com/pubview/IPCOM000113740D.

* cited by examiner

*Primary Examiner* — Glenn A Auve
(74) *Attorney, Agent, or Firm* — Zilka-Kotab, PC

(57) ABSTRACT

High-speed serial communications between programmable devices connected to an I2C bus that includes a serial clock channel (SCL) and a serial data channel (SDA), having at least a logical low state and a logical high state. The programmable device determines if the SCL channel is idle, indicated by a logical high state. Determining the SCL to be idle, the programmable device holds the SCL to a logical low state. The programmable device operates high-speed serial communications using the SDA channel while holding the SCL to the low logical state. In response to completion of the high-speed communications, the programmable device releases the SCL channel and the SCL channel returns to the logical high state.

17 Claims, 5 Drawing Sheets

HIGH SPEED OVERLAY OF IDLE I2C BUS BANDWIDTH

FIELD OF THE INVENTION

The present invention relates generally to the field of bus interfaces for computing devices and components, and more particularly to accessing idle bandwidth of an I2C bus for a high speed serial communication interface.

BACKGROUND OF THE INVENTION

Architectural designs for printed circuit boards (PCBs) of electronic devices connect components by a communication channel referred to as a bus. A bus may be considered a parallel bus when it consists of parallel bit lanes transmitting data in clock synchronous or asynchronous fashion. A bus is considered to be a serial bus when data is transmitted on a single data lane, either synchronously or asynchronously.

Computing devices and many electrical components make use of multiple buses, interconnected through bridges forming a communications fabric. Various devices, such as integrated circuits (ICs), and devices that include ICs are typically attached to a bus that is controlled by one or more programmable microcontrollers. A simple and commonly used bus is the inter-integrated circuit (I2C, "eye two see") bus, also known as the "eye squared see" bus ($I^2C$). The I2C bus physically consists of 2 active wires and a ground connection. The active wires are the serial data line (SDA) and the serial clock line (SCL), and are both bi-directional. Every device connected to the bus is assigned a unique address, regardless of whether it is a microcontroller (MCU), a liquid crystal display (LCD) driver, a memory device, or an application-specific integrated circuit (ASIC). Devices on an I2C bus can act as a receiver and/or transmitter, depending on their functionality, (an LCD driver is only a receiver). The I2C bus can support multi-masters, meaning that more than one IC capable of initiating a data transfer can be connected to the bus. An IC that that initiates a data transfer on the bus is considered the bus master for that transaction, according to the I2C protocol, and all other devices connected to the bus assume the role of bus slaves.

The I2C bus is generally used to connect slow-speed peripherals to embedded devices, motherboards, PCB cards, cell phones, and other electronic devices and components. The main objective behind the I2C bus was to establish a simple low pin count bus that can connect different ICs on a circuit board of industrial controls, televisions or radios. Later, I2C grew beyond the limits of TV and Radio and is now found in almost every computer motherboard and other embedded devices, such as industrial and slow, remote applications. I2C can also be used for communication between multiple circuit boards in equipments with or without using a shielded cable depending on the distance and speed of data transfer.

As the density of PCB circuitry continues to increase, minimizing the circuit density, required device pins, and the number of interfaces has become significantly important in computer and component design architecture. Methods to reduce the number of interfaces within the communication fabric of computing devices and components while allowing increase of circuit density and the number of interconnected devices continue to be explored.

As more devices are connected to a bus, the speed of the bus reduces due to the capacitive loading effect of the devices. The I2C bus is generally associated with transmission speeds up to 400 Kb/sec, with higher speed (up to 3.4 Mb/sec) possible with the appropriate configuration, and has a maximum capacitance of 400 picofarads (pF). Thus the I2C bus can be considered a slow, synchronous bus with a speed that is limited by the pull-up resistors needed for the master-slave arrangement and the physical bus capacitance. Devices such as field programmable gate arrays (FPGAs) and complex programmable logic devices (CPLDs) are capable of communication transmission speeds that are generally much higher than a typical I2C bus, for example, gigabit/sec transmission rates. This requires additional bus interface and protocol designs for PCBs and computing devices that employ FPGAs and CPLDs.

SUMMARY

Embodiments of the present invention disclose a method, computer program product, and system for serial communications of a programmable device connected to an I2C bus, the bus including a serial clock channel (SCL) and a serial data channel (SDA), and the channels including at least a first logical state and a second logical state. The programmable device determines if the SCL channel and the SDA channel are idle, wherein the idle SCL channel is at the second logical state. Responsive to the SCL channel and the SDA channel being idle, the programmable device transmits a signal holding the SCL to the first logical state. The programmable device operates high-speed serial communications using the SDA channel and in response to completion of the high-speed serial communications, the programmable device releases the SCL channel and the SCL channel returns to the second logical state.

DETAILED DESCRIPTION

Figure 1:
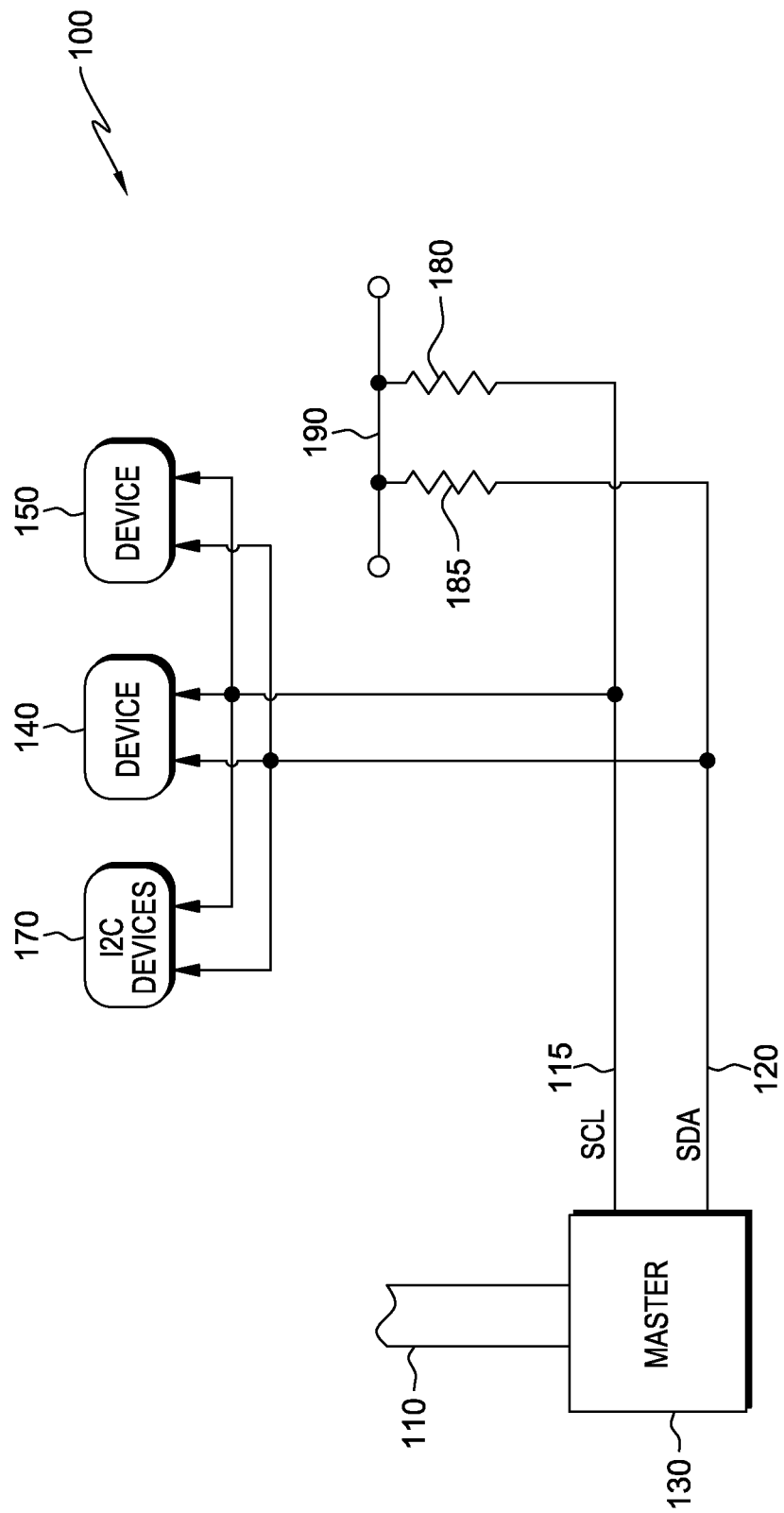
FIG. 1 is a functional block diagram illustrating an I2C bus environment, in accordance with an embodiment of the present invention

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention utilize idle cycle bandwidth of an I2C bus as an interface for a high-speed communications bus between programmable devices, activated by a bus master controller device connected to the I2C channels. The bus master controller device holds the SCL at a logical low state and completing high-speed communication operations, followed by the bus master controller device setting the SDA to the logical high state and releasing the SCL from a logical low state. The SCL returns to a logical high state and normal I2C operation continues. Multiple asynchronous, single bit lane (wire) operations are possible over the SDA during this bus cycle. Devices utilizing idle bandwidth of an I2C bus for high-speed communications may use a high-speed, single-ended, serial protocol.

The present invention will now be described in detail with reference to the Figures. FIG. 1 is a functional block diagram illustrating an I2C bus environment, generally designated 100, in accordance with one embodiment of the present invention. I2C bus environment 100 includes master 130, additional bus connection 110, devices 140 150, and I2C devices 170, serial clock circuit line (SCL) 115, serial data circuit line (SDA) 120, pull-up resistors 180 and 185, and power rail 190. I2C bus environment 100 also includes I2C overlay program 400 (not shown), operated by a programmable bus master controller, such as master 130.

In a preferred embodiment of the present invention I2C bus environment 100 includes an I2C bus that has bi-directional communication channels and may be part of the communications fabric of a computing device, such as a desktop computer, a laptop computer, a tablet computer, a netbook, a server computer, a personal data assistant (PDA), a smartphone, or may be included in electronic devices requiring signal processing, such as audio or video processing, or used in other control and signal processing applications.

The I2C bus is capable of supporting multiple controlling devices, such as master 130. Master 130 includes a programmable microprocessor and assumes a controlling function for the bus, when operating as a master role in a master/slave relationship, with the additional devices attached to the I2C bus acting in a slave role. Master 130 is connected to SDA 120 and SCL 115, controls clock signals transmitted on SCL 115, and transmits and receives data signals on SDA 120. Slave devices have configurable address pins and internally addressable registers, with which master 130 identifies each device on the I2C bus by physical and logical addresses, establishing device identity in support of communications between master 130 and the slave devices. Master 130 is also connected to bus connection 110, which may connect to a system bus, or another bus as part of the communication fabric of a computing device or electronic device.

SCL 115 and SDA 120 are each bi-directional signal lines forming the communications channels of the I2C bus, interconnecting attached devices and master controllers. SCL 115 carries clock signals produced by a master controller, such as master 130. The clock signals generally include at least two voltage states referred to as a logical high state and a logical low state. The minimum and maximum voltages for the high and low states are dependent on the specific electrical bus signaling implementation, ranging typically between 2.5V and 5V. Typically the low state is a non-zero voltage with a value near zero and the high state is discernable from the low state voltage by the attached devices and one or more master controller, and may be a value such as +2.5V or +5.0 V, as stated above. SDA 120 carries data signals to and from master 130 and to and from devices, such as devices 140, 150 and I2C devices 170, attached to I2C bus environment 100, and similarly has a logical high state and a logical low state. The number of devices that can attach to an I2C bus is limited by the address space (7 bit addressing) and also by the total bus capacitance limitation of 400 pF.

I2C bus environment 100 includes device 140 and device 150 which are connected to the I2C bus lines SCL 115 and SDA 120. In an embodiment of the present invention, device 140 is a FPGA or a CPLD. An FPGA is an integrated circuit designed to be configured by a customer or a designer after it is manufactured, thus being "field-programmable". The FPGA configuration is generally specified using a hardware description language (HDL), similar to that used for an application-specific integrated circuit (ASIC). FPGAs can be used to implement any logical function that an ASIC performs. The ability to update the functionality after shipping, and the low cost relative to an ASIC design, offers many advantages.

In an embodiment of the present invention, device 150 is a CPLD or a FPGA, which can be used to perform the function of many logic ICs. A small CPLD can replace the function of a handful of standard logic IC's, whereas a large CPLD can replace the function of hundreds of logic ICs, resulting in a drastic reduction of required circuit board space and power consumption. The logic function performed by a CPLD is user-programmable, and can be erased and re-programmed, on the fly, many times. FPGAs and CPLDs communicate at high-speed and typically can transmit and receive communications at rates that are orders of magnitude higher than the typical device connected to I2C bus channels.

I2C devices 170 may be devices such as a digital visual interface (DVI) display driver, an audio or video signal processor, an analog to digital converter, a digital to analog converter, a non-volatile random-access memory (NVRAM) chip for user settings, sensors for reading CPU temperature and fan speed, reading real-time clocks, monitoring voltages, turning the power supply of system components on and off, controlling OLED or LCD displays, and reading configuration data from SPD EEPROMS on various memory modules. I2C devices 170 typically function as slave devices in a master/slave relationship, however, the I2C protocol allows for any device on the I2C bus to postpone master controller transmissions for a period of time, by forcing SCL 115 line to a logical low state until the I2C device is prepared to continue transmitting or receiving data.

SCL 115 and SDA 120 are shown in FIG. 1 as having pull-up resistors 180 and 185 attached, respectively. SCL 115 and SDA 120 are open-collector outputs from bipolar transistors. SLC 115 and SDA 120, in combination with pull-up resistors 180 and 185, are connected to power rail 190 and create a circuit technique used to allow multiple devices to communicate bi-directionally on a single wire. Power rail 190 operates with pull-up resistors 180 and 185 to hold the I2C channels at a logical high state until a device on the wire sinks enough current to pull the line to a logical low state. After a device, such as devices 140 and 150, I2C devices 170, or master 130, for example, releases the channels from a logical low state, power rail 190 and pull-up resistors 180 and 185 function collectively to bring SDA 120 and SCL 115 bus channels to a logical high state. In a preferred embodiment of the present invention, device 140 and device 150 are programmed to control the I2C bus for transmitting and receiving high speed communications, when the bus channels are detected to be idle, by holding SCL 115 to a logical low state and using the connection to SDA 120 for serial transmission or receipt of data.

Figure 2:
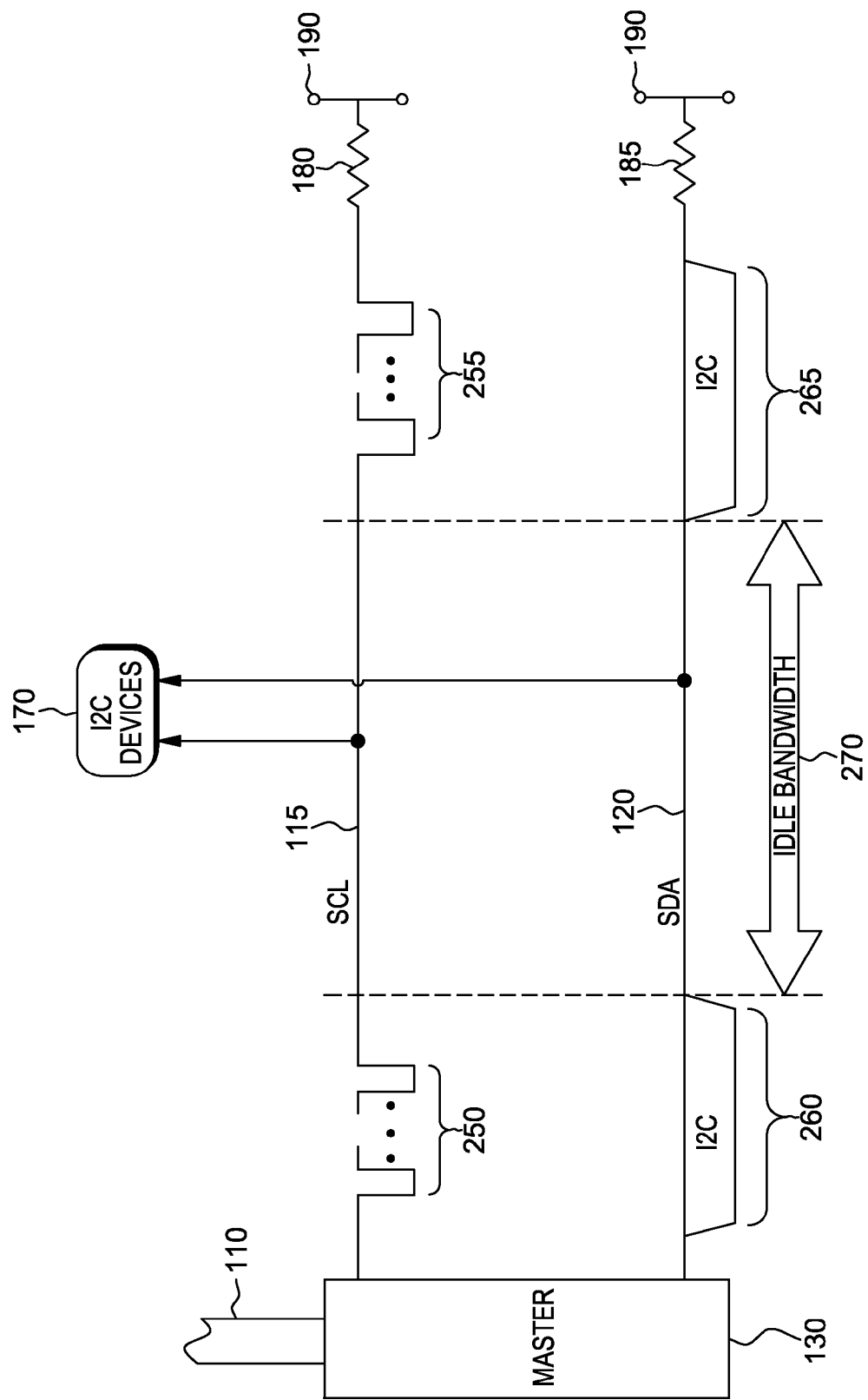
FIG. 2 is a block diagram illustrating communication activity on an I2C bus including idle bandwidth, in accordance with an embodiment of the present invention.

FIG. 2 is a block diagram illustrating communication activity on an I2C bus including idle bandwidth, in accordance with an embodiment of the present invention. In an exemplary embodiment, the I2C bus of FIG. 2 includes connected IC devices (connected I2C devices other than master 130 not shown) such that the overall capacitance of the bus is well below the 400 pF specification limit. Master 130 is shown connected to SCL 115 and SDA 120 and SCL 115 includes a connection to pull-up resistor 180, which is connected to power rail 190, as discussed with respect to the FIG. 1 discussion above. Similarly, SDA 120 includes a connection to pull-up resistor 185, which is connected to power rail 190.

First activity clock 250 is part of a communication transaction on the I2C bus following the I2C protocol. First activity clock 250 is shown as including the clock pulses on SCL 115 of I2C communication of master 130 to a device on the I2C bus. In one embodiment, first activity clock 250 includes the clock pulses of SCL 115 for the transactions of the I2C protocol for I2C device communications. Second activity clock 255 similarly represents the clock pulses of SCL 115 associated with a subsequent second I2C communication on the I2C bus, with idle bandwidth 270 depicting a period in which the I2C bus is idle.

First activity data 260 is part of an I2C communication transaction on the I2C bus that follows the I2C protocol and includes the serial data transmission on SDA 120 for the first communication activity. Second activity data 265 similarly depicts the data transmissions on SDA 120 associated with a second communication on the I2C bus.

Between the first and second communications activity is idle bandwidth 270, which depicts both SCL 115 and SDA 120 in a logical high state and defines a region in which there are no I2C communications. An I2C bus has properties that support different communication speeds for different devices attached to the bus, and particularly support for slower communication rates. An I2C bus may typically operate at a communication rate of 400 Kb/sec, with faster rates possible with additional conditions and properly configured devices. However, an I2C bus that includes connected devices operating at a standard I2C mode transmission rate can experience significant amounts of idle bandwidth on the bus (i.e. idle bandwidth 270). Idle bandwidth 270 provides an opportunity to overlay a high-speed interface for programmable devices.

In embodiments of the present invention, idle bandwidth 270 includes bus cycles in which SCL 115 held to a logical low state, sometimes referred to as clock stretching, enabling high-speed communications.

Figure 3:
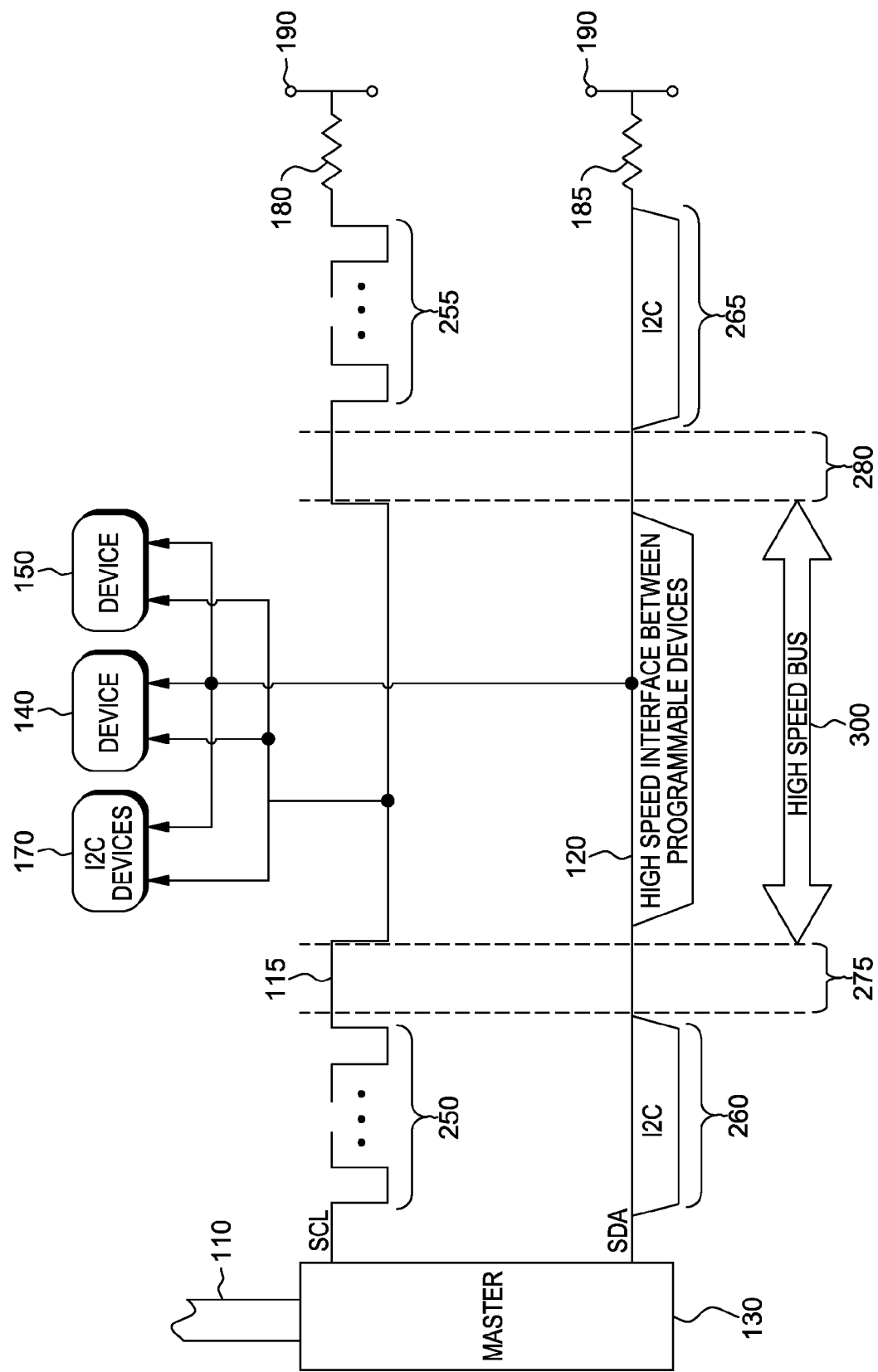
FIG. 3 is a block diagram illustrating a high speed overlay of an I2C bus, in accordance with an embodiment of the present invention.

FIG. 3 illustrates a high speed overlay on an I2C bus in I2C bus environment 100 during an I2C bus phase in which SCL 115 is held to a logical low state, in accordance to an embodiment of the present invention. Master 130, devices 140, 150, and I2C devices 170 are depicted as connected to SCL 115 and SDA 120 of an I2C bus, and SCL 115 and SDA 120 are connected to pull-up resistors 180 and 185 respectively. As discussed with respect to FIG. 1, devices 140 and 150 are high-speed programmable devices such as FPGAs or CPLDs. First activity clock 250 and first activity data 260 are shown as a first communication activity between master 130 and I2C devices 170 using I2C protocol on SCL 115 and SDA 120 bus channels. Similarly second activity clock 255 and second activity data 265 are shown as corresponding to a second communication activity using I2C protocol on SCL 115 and SDA 120 bus channels. Idle I2C bus 275 and 280 depict a condition in which SCL 115 and SDA 120 are both at the logical high state.

High speed bus 300 is shown between the first and second I2C communication activities and serves as an interface for high speed serial communications between master 130, devices 140 and 150, and may communicate to other components accessible through bus connection 110. I2C connected devices that have been programmed to respond to high-speed serial communications on SDA 120 while SCL 115 is held at a low logical state, will respond to high-speed communications. Regular I2C devices, such as I2C devices 170, having not been identified to master 130 as capable of high-speed communications, do not respond to activity on SDA 120 during high-speed transmission.

In a preferred embodiment of the present invention, master 130 and devices 140 and 150 are programmed to determine when the channels of the I2C bus are idle, a condition in which SCL 115 and SDA 120 both remain at a logical high state, which indicates the I2C bus is idle. Detecting the idle condition of SCL 115 and SDA 120, master 130 initiates a signal that holds SCL 115 to a logical low state. Holding SCL 115 to a logical low state will prevent transmissions from the other devices connected to the I2C bus, which remain idle until SCL 115 is released and returns to the logical high state. Holding SCL 115 at the logical low state, master 130 begins high-speed transmission, effectively using the idle bandwidth of the I2C bus for high-speed serial communications. The high-speed serial communications may use a high speed protocol to identify the target device for communication, and may include acknowledgements, and other protocol elements to support high-speed serial communications. In one embodiment, devices 140 and 150 may be connected directly to or multiplexed with, SCL 115 and SDA 120.

For example, an I2C communication transaction, such as first activity data 260 and first activity clock 250, are initiated on SDA 120 and SCL 115 by a master controller and I2C protocol conditions are followed. The I2C communication is targeted to one of I2C devices 170, the transmission is sent and the I2C transaction is completed. Master 130 determines that SCL 115 and SDA 120 both remain at the logical high state, for example the condition represented by idle I2C bus 275, indicating that the I2C bus is idle. Master 130 initiates a signal to hold SCL 115 at the logical low state and begins high-speed serial communications on SDA 120, for example, sending instructions to device 140 indicating that a high-speed "write" transaction will follow. Device 140 acknowledges transmissions received from master 130 and waits to receive the high-speed data from master 130. After device 140 determines the transmission is complete, it returns to the I2C signaling level, and Master 130 returns output to pull-up resistors 180 and 185 and power rail 190. Master 130 releases SCL 115, and SDA 120 and SCL 115 are restored to an idle condition in which both channels are at the logical high state, for example idle I2C bus 280.

When master 130 has completed the high-speed communications, both SCL 115 and SDA 120 channels return to the logical high state, normal I2C transactions continue. For example, the I2C transactions of second activity clock 255 and second activity data 265 are depicted as an additional I2C communication following a period of time in which the I2C bus was used for high-speed serial communications.

Figure 4:
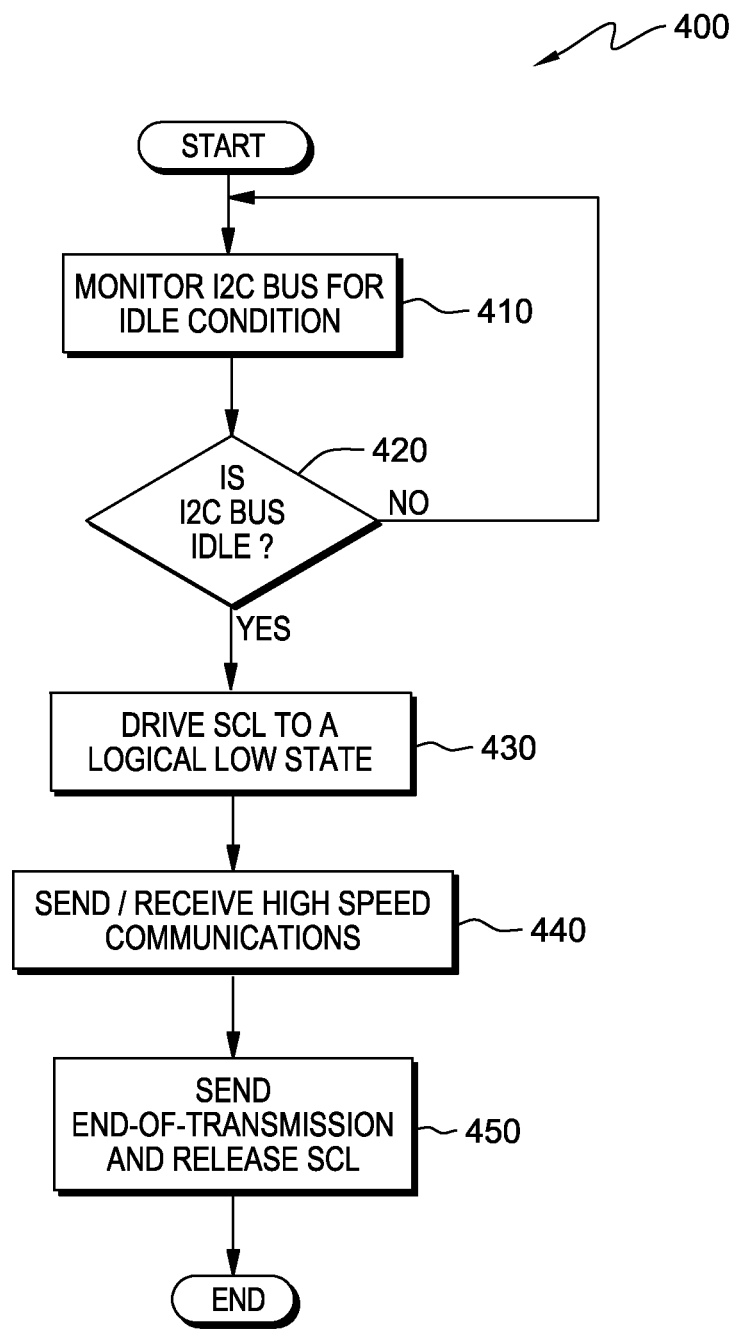
FIG. 4 illustrates a flowchart of I2C overlay program inserted on a component device within the I2C bus environment of FIG. 1, in accordance with an embodiment of the present invention.

FIG. 4 illustrates a flowchart of I2C overlay program 400 installed on at least one programmable master controller device within I2C bus environment 100 of FIG. 1, in accordance with an embodiment of the present invention. I2C overlay program 400 is executed by a programmable master controller device connected to the channels of an I2C bus. I2C overlay program 400 monitors the I2C bus to determine when the bus is idle, which is indicated by the SCL and SDA remaining, (for minimum period of time, for example 1 us min.) at the logical high state (step 410). For example, an I2C protocol transaction is in progress on SCL 115 and SDA 120, with the logical state of SCL 115 and SDA 120 changing between logical high and low state to reflect the I2C protocol activity. I2C overlay program 400 monitors SCL 115 and SDA 120 to identify an idle condition of the I2C bus (step 410). The period of time that SCL 115 and SDA 120 both remain at a logical high state to indicate an idle I2C bus may vary depending on the devices connected to the I2C bus. In one embodiment of the present invention, a minimum of 1 μs in which both SDA 120 and SCL 115 are at the logical high state indicates that the I2C bus channels are idle, and high-speed serial communication activity may be initiated. In other embodiments, a period of time less than 1 μs, with both SDA 120 and SCL 115 at the logical high state, may be used to indicate idle I2C bus channels.

Monitoring the I2C bus and detecting the SCL or the SDA at the logical low state, I2C overlay program 400 determines that the I2C bus is active and I2C overlay program 400 continues to monitor the logical state of SCL 115 and SDA 120 to identify idle conditions of the I2C bus (step 420, "no branch"). For example, I2C overlay program monitors SCL 115 and SDA 120 I2C bus channels and determines that at least one of the channels are either not at the logical high state, or do not remain at the logical high state for a minimum of 1 μs. I2C overlay program 400 continues to monitor the logical states of SCL 115 and SDA 120 (step 420, "no branch").

At the conclusion of an I2C protocol transmission, the I2C SCL and SDA channels return to a logical high state, and remain at the logical high state due to current I2C communications having been completed. I2C overlay program 400 detects this condition and determines that the I2C bus is idle, (step 420, "yes" branch).

For example, I2C overlay program 400, monitoring SCL 115 and SDA 120, determines that SCL 115 and SDA 120 both remain at the logical high state for at least a minimum of 1 μs, for example, indicating the I2C bus is idle (step 420, "yes" branch).

I2C overlay program 400 initiates a signal to drive the SCL to a logical low state and holds the SCL at the logical low state (step 430). For example, I2C overlay program 400 initiates a signal that drives SCL 115 to the logical low state and holds it at the logical low state until the high-speed serial communications are complete. Holding SCL 115 at a logical low state causes the "slave" devices connected to the I2C bus, that are not targeted by the master controller to remain idle (step 430).

I2C overlay program 400 sends a transmission to identify (target) a high-speed-capable device connected to the I2C bus channels and initiates sending/receiving of high-speed communications to the high-speed capable device (step 440).

In an exemplary embodiment, I2C overlay program 400, holding SCL 115 at a logical low state, begins sending high-speed communications on SDA 120 to identify the targeted device, such as device 140. I2C overlay program 400 receives from device 140, an acknowledgement of identity and acknowledgement of a forthcoming high-speed transmission from I2C overlay program 400, ("read" or "write"). Device 140 waits for the high-speed data from I2C overlay program 400 ("write" transmission), receiving the transmission when sent. I2C overlay program 400 receives an acknowledgement from device 140, of receiving the transmitted data. If device 140 needs to send data to I2C overlay program 400, the acknowledgement of received data from device 140 will include a signal indicating that a data transmission to I2C overlay program 400 is to follow. I2C overlay program 400 sends an acknowledgement to device 140 when the data is received, and high-speed serial transmissions continue, until complete (step 440). In a preferred embodiment the high-speed communications follow a high-speed serial protocol that includes, but is not limited to, protocol steps of: start-of-transmission, read/write, acknowledgement and end-of-transmission conditions.

In one embodiment of the present invention, after all high speed transmissions are complete, I2C overlay program 400 sends an "end-of-transmission" message to the target device and I2C overlay program 400 releases the SCL from the logical low state (step 450). For example, I2C overlay program 400 completes a final data transmission to device 140 and receives acknowledgement that the data was received. I2C overlay program 400 indicates the completion of all transmissions by sending an "end-of-transaction" message to device 140. Device 140 receives the end-of-transaction message and returns to the electrical signaling level for normal I2C protocol bus transactions. I2C overlay program 400 releases SCL 115 from the logical low state, and SCL 115 returns to the logical high state via pull-up resistor 180. High-speed serial data transmissions having been completed, I2C overlay program 400 sets SDA 120 to the logical high state (step 450). The I2C bus returns to an idle condition with both SCL 115 and SDA 120 at the logical high state. Normal I2C protocol activity may proceed, and I2C overlay program 400 ends.

Figure 5:
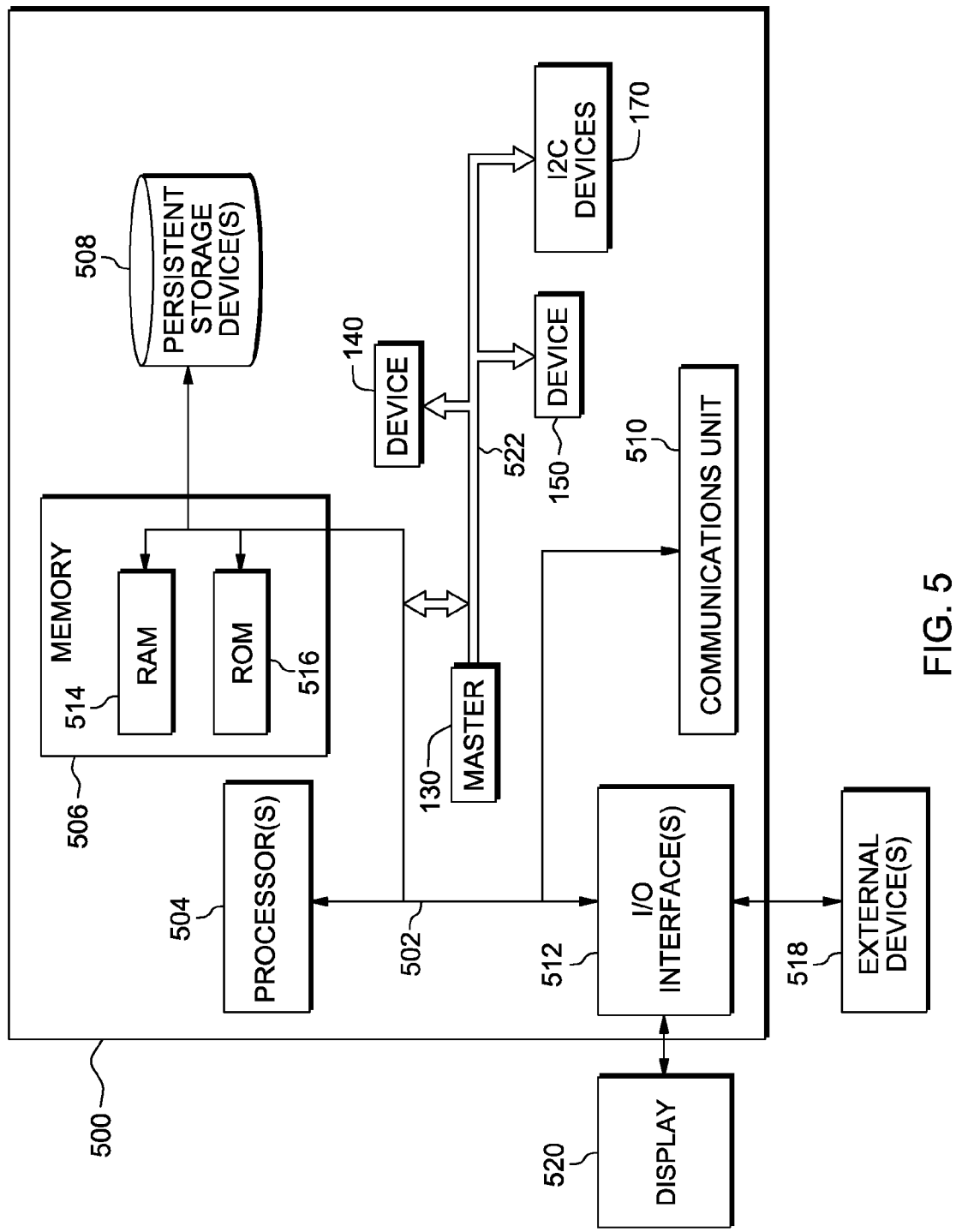
FIG. 5 depicts a block diagram of components of the proxy server computer executing the intelligent mapping program, in accordance with an embodiment of the present invention.

FIG. 5 depicts a block diagram of components of computing device 500 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, persistent storage 508, communications unit 510, input/output (I/O) interface(s) 512, and I2C bus 522. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with multiple buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

I2C overlay program 300 is stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

In a preferred embodiment bus 522 is an I2C bi-directional, two-line bus including a SCL and a SDA. The SCL and SDA of I2C bus 522 are used by master 130 and I2C devices 170 for I2C protocol communications, and in embodiments of the present invention, are used by devices 140 and 150 as a high-speed serial communications bus by executing I2C overlay program 400, which uses available bandwidth of the I2C bus. Although a single instance of bus 522 is depicted in FIG. 5, other embodiments may include multiple instances of bus 522.

Communications unit 510, in these examples, provides for communications with other data processing systems or devices, including resources of I2C bus environment 100 and devices 140, 150, and I2C devices 170. In these examples, communications unit 510 includes one or more network interface cards. Communications unit 510 may provide communications through the use of either or both physical and wireless communications links. I2C overlay program 400 may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., I2C overlay program 400, can be stored on such portable computer-readable storage media and can be loaded onto persistent storage 508 via I/O interface(s) 512. I/O interface (s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for serial communications of a programmable device connected to an I2C bus, the I2C bus including a serial clock channel (SCL) and a serial data channel (SDA), the SCL channel and the SDA channel including at least a first logical state and a second logical state, the method comprising:

the programmable device determining if the SCL channel and the SDA channel are idle, wherein an idle SCL channel and an idle SDA channel are at the second logical state;

in response to the SCL channel and the SDA channel being idle, the programmable device transmitting a signal holding the SCL channel to a first logical state;

the programmable device operating high-speed serial communications using the SDA channel, wherein the high-speed serial communications include a serial communications rate in excess of 3.4 megabits per second (Mbit/s); and in response to completion of the high-speed serial communications, the programmable device releasing the SCL channel and the SCL channel returning to the second logical state.

2. The method of claim 1, further comprising:
the programmable device returning the SDA channel to the second logical state in response to completion of the high-speed serial communications.

3. The method of claim 1, wherein the programmable device operating the high-speed serial communications uses a high-speed serial protocol.

4. The method of claim 1, wherein the programmable device is multiplexed to the I2C bus.

5. The method of claim 1, wherein operating the high-speed serial communications includes transmitting communications or receiving communications or both.

6. The method of claim 5, wherein transmitting communications or receiving communications or both, further includes transmitting or receiving data or instructions or both.

7. A computer program product for serial communications of a programmable device connected to an I2C bus, the bus including a serial clock (SCL) channel and a serial data (SDA) channel, the SCL channel and the SDA channel including at least a first logical state and a second logical state, the computer program product comprising:

one or more computer-readable tangible storage devices and program instructions stored on at least one of the one or more storage devices, the program instructions comprising:

program instructions to determine if the SCL channel and the SDA channel are idle, wherein the idle SCL channel and the idle SDA channel are at a second logical state;

in response to the SCL channel and the SDA channel being idle, program instructions to transmit a signal to hold the SCL channel to a first logical state;

program instructions to operate high-speed serial communications using the SDA channel, wherein the high-speed serial communications include a serial communications rate in excess of 3.4 megabits per second (Mbit/s); and in response to completion of the high-speed serial communications, program instructions to release the SCL channel and the SCL channel returning to the second logical state.

8. The computer program product of claim 7, further comprising:
program instructions to return the SDA channel to the second logical state in response to completion of the high-speed serial communications.

9. The computer program product of claim 7, further comprising:
program instructions to operate the high-speed serial communications using a high-speed, single ended, serial protocol.

10. The method of claim 7, further comprising:
program instructions to operate the high-speed serial communications including transmitting communications or receiving communications or both.

11. The computer program product of claim 10, wherein transmitting communications or receiving communications or both, further comprises:
program instructions for transmitting or receiving data, transmitting or receiving instructions, or both.

12. A system for serial communications of a programmable device connected to an I2C bus, the bus including a serial clock (SCL) channel and a serial data (SDA) channel, the SCL channel and the SDA channel including at least a first logical state and a second logical state, the system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to determine if the SCL channel and the SDA channel are idle, wherein the idle SCL and the idle SDA channel are at a second logical state;

in response to the SCL channel and the SDA channel being idle, program instructions to transmit a signal holding the SCL channel to a first logical state;

program instructions to operate high-speed serial communications using the SDA channel, wherein the high-speed serial communications include a serial communications rate in excess of 3.4 megabits per second (Mbit/s); and in response to completion of the high-speed serial communications, program instructions to release the SCL channel and the SCL channel returning to the second logical state.

13. The system of claim 12, further comprising:
program instructions to return the SDA channel to the second logical state in response to completion of the high-speed serial communications.

14. The system of claim 12, further comprising:
program instructions to operate the high-speed serial communications using a high-speed, single-ended, serial protocol.

15. The system of claim 12, further comprising:
program instructions to multiplex a programmable device to the I2C bus.

16. The system of claim 12, further comprising:
program instructions to operate the high-speed serial communications including transmitting communications or receiving communications or both.

17. The system of claim 16, wherein transmitting communications or receiving communications or both, further comprises:
 program instructions for transmitting or receiving data, transmitting or receiving instructions, or both.

\* \* \* \* \*